United States Patent
Sugiyama

(10) Patent No.: US 6,188,725 B1
(45) Date of Patent: Feb. 13, 2001

(54) INTERLACED VIDEO SIGNAL ENCODING AND DECODING METHOD, BY CONVERSION OF SELECTED FIELDS TO PROGRESSIVE SCAN FRAMES WHICH FUNCTION AS REFERENCE FRAMES FOR PREDICTIVE ENCODING

(75) Inventor: Kenji Sugiyama, Yokosuka (JP)

(73) Assignee: Victor Company of Japan, Ltd., Yokohama (JP)

( * ) Notice: Under 35 U.S.C. 154(b), the term of this patent shall be extended for 0 days.

(21) Appl. No.: 09/061,563

(22) Filed: Apr. 16, 1998

(30) Foreign Application Priority Data

| May 30, 1997 | (JP) | 9-157806 |
| Sep. 8, 1997 | (JP) | 9-259291 |

(51) Int. Cl.[7] ............................................. H04N 7/12
(52) U.S. Cl. ............................ 375/240; 375/240.12
(58) Field of Search .................. 348/415, 402, 348/408, 446, 628

(56) References Cited

U.S. PATENT DOCUMENTS

| 4,709,394 | * | 11/1987 | Bessler et al. ................. 348/408 |
| 4,985,768 | | 1/1991 | Sugiyama ........................ 348/402 |
| 5,337,089 | * | 8/1994 | Fisch ............................. 348/446 |
| 5,353,119 | * | 10/1994 | Dorricott et al. ............... 348/446 |
| 5,530,482 | * | 6/1996 | Gove et al. ..................... 348/441 |
| 5,666,461 | * | 9/1997 | Igarashi et al. ................. 348/415 |
| 5,940,141 | * | 8/1999 | Faroudja et al. ................ 348/628 |

FOREIGN PATENT DOCUMENTS

| 0634871 | 1/1995 | (EP) . |
| 2-192378 | 7/1990 | (JP) . |
| 3-132278 | 6/1991 | (JP) . |
| 9404000 | 2/1994 | (WO) . |

* cited by examiner

Primary Examiner—Chris S. Kelley
Assistant Examiner—Allen Wong
(74) Attorney, Agent, or Firm—Anderson, Kill & Olick P.C.

(57) ABSTRACT

An encoding apparatus includes a selector for periodically selecting fields of an interlaced video signal to be converted to respective progressive scanning frames, by a scanning converter which doubles the number of scanning lines per field. The apparatus encodes these frames by intra-frame encoding or unidirectional predictive encoding using preceding ones of the frames, and encodes the remaining fields of the video signal by bidirectional prediction using preceding and succeeding ones of the progressive scanning frames for reference. The resultant code can be decoded by an inverse process to recover the interlaced video signal, or each decoded field can be converted to a progressive scanning frame to thereby enable output of a progressive scanning video signal. Enhanced accuracy of motion prediction for inter-frame encoding can thereby be achieved, and generation of encoded aliasing components suppressed, since all reference pictures are progressive scanning frames rather than pairs of fields constituting interlaced scanning frames.

13 Claims, 7 Drawing Sheets

INTERLACED VIDEO SIGNAL ENCODING AND DECODING METHOD, BY CONVERSION OF SELECTED FIELDS TO PROGRESSIVE SCAN FRAMES WHICH FUNCTION AS REFERENCE FRAMES FOR PREDICTIVE ENCODING

FIELD OF THE INVENTION

The present invention relates to a method and apparatus for high-efficiency encoding to efficiently convert an interlaced type of video signal into a stream of compressed code, for the purpose of transmission or storage. In particular, the invention relates to encoding processing which uses bidirectional motion prediction encoding, applied to an interlaced type of video signal.

In the following, the term "picture" will be used as a general term for referring to the contents of afield of an interlaced video signal, or a frame of aprogressive scanning (i.e., non-interlaced) type of video signal.

DESCRIPTION OF THE PRIOR ART

A method of high-efficiency video encoding for an interlaced type of video signal is known whereby one in every m successive frames (where m is an integer of 2 or more) is encoded either independently by internal encoding or by unidirectional predictive encoding, while the remaining frames (referred to as the B frames)are encoded by bidirectional predictive encoding using preceding and succeeding ones of the aforementioned specific frames (i.e., I or P frames).

Such predictive encoding of a video signal is now well known in the art, being described for example in Japanese patent laid-open number HEI 2-192378, of the assignee of the present invention, etc. The technique is also used with the MPEG-1 system (ISO/IEC-11172), and the MPEG-2 system (ISO/IEC-13818).

It can be understood from the above that with such a method three different picture types are established, in accordance with the form of encoding that is applied, i.e. the I frames, the P frames and the B frames, and that only the I frames and P frames are used as reference frames for encoding.

Assuming that the frame period is 1/30 second, the first and second fields of each frame of the interlaced video signal are time-displaced by 1/60 second, and are also mutually displaced by one scanning line position, in the vertical direction of the picture. As a result, appropriate prediction for the purpose of picture encoding cannot be achieved by using a simple inter-frame prediction method. In such a case, a method is used such as with the NPEG-2 standard etc., whereby processing is performed in units of fields, with a plurality of fields being used to constitute a reference picture, or whereby processing is basically performed in units of frames, but with prediction being switched to perform local prediction in units of fields when necessary.

In particular, in the case of the MPEG-2 standard, each of the aforementioned picture types (i.e., I, P, B) must be established in units of frames. That is to say, even if prediction processing is performed in units of fields, the I-pictures and B-pictures must each be set as respective consecutive pairs of fields.

Whichever method is used, when motion is detected between the contents of successive fields, prediction is performed in units of fields. In that case, due to the scanning line configuration of the interlaced signal, large amounts of aliasing components will be generated and encoded, due to the one-line vertical displacement between successive interlaced fields. As a result, even if the picture motion only consists of a parallel shift of the picture, comparatively large amounts of prediction error values will be generated and encoded, so that the predictive encoding process will generate excessively large amounts of code, i.e. the objective of achieving a high efficiency of data compression through encoding will not be met.

FIG. 5 shows an example of the configuration of a prior art type of video encoding apparatus which uses bidirectional prediction for encoding the B fields. It will be assumed that prediction is performed in units of fields, but that the I, P and B picture types are established in units of interlaced frames as described above.

The interlaced video signal which is input to the video input terminal 7 is supplied to the input signal selection switch 56 which is controlled to operate in synchronism with successive fields of the input video signal such that the I and P frames are supplied to a subtractor 51 while the B frames are supplied to a frame delay element 61. It should be noted that the term "video signal" as used herein signifies a digital video signal.

One out of every m successive frames of the input video signal is selected as an I or a P frame, (where m will in general have a value of 2 or 3). The proportion of I frames to P frames is a matter of design choice. The subtractor 51 subtracts an inter-picture prediction signal (i.e., consisting of successive predicted values for respective pixels of a frame) that is produced by an inter-picture prediction section 57 from the I or P frame signal which is supplied thereto, and supplies the resultant difference values, i.e. prediction error values, to a DCT section 52. The DCT section 52 performs DCT (Discrete Cosine Transform) conversion processing on successive sets of prediction error values which correspond to respective blocks of 8×8 (or 16×16) pixels of a picture, and the transform coefficients thereby obtained are supplied to a quantizer 53. The quantizer 53 performs quantization of the coefficients, using a predetermined quantization step size, and the resultant fixed-length encoded coefficients are supplied to a variable-length encoder 54 and to a dequantizer 55.

The variable-length encoder 54 performs array conversion of the 2-dimensional 8×8 sets of coefficients into a 1-dimensional sequence, using zig-zag sequence processing, and encodes the result by Huffman encoding, i.e. using the numbers of runs of coefficient values of zero or of coefficient values other than zero. The resultant code sequences into which the I and P frames have been respectively converted are multiplexed with the code sequences which are obtained for the B frames, by the multiplexer 13, and the resultant code stream is supplied to the code output terminal 14.

The dequantizer 55 and the inverse DCT section 60 perform the inverse processing to that of the quantizer and the DCT section 52, to thereby reproduce the inter-picture prediction error values, and the values thus obtained are added to the prediction signal by the adder 59, to obtain values expressing successive reconstructed pictures, which are supplied to the picture memory 58. The reconstructed pictures which are thus stored in the picture memory 58 are thereafter read out and supplied to the inter-picture prediction section 57 at appropriate timings.

The inter-picture prediction section 57 generates different prediction signals in accordance with respective types of picture (i.e., I, P or B), supplies the prediction signals derived for the I and P frames to the subtractor 51, and supplies the prediction signals derived for the B frames to one input of the subtractor 17.

Since no prediction is performed for an I frame, the prediction signal values for an I frame are always zero. In the case of a P frame, the prediction signal is obtained based on a preceding I or P frame. In the case of a B frame, the prediction signal is obtained based on preceding and succeeding I or P frames.

With this method, since prediction is performed in units of fields, both even fields and odd fields of a reconstructed frame may be used as reference pictures. Of these, the field which results in the smallest amount of prediction error is used as a reference for deriving the prediction signal.

When a B frame signal is selected by the switch 56, the frame delay section 61 applies a delay of (m−1) frames, and the delayed B frame signal is then supplied to the subtractor 17. Since the picture type is established in units of frames, the delay must be established in units of frame periods. The resultant delayed picture signal (i.e. successive pixel values) is input to the subtractor 17 in synchronism with predicted values supplied from the inter-picture prediction section 57, to obtain respective prediction error values for the B frame, which are encoded by the DCT section 18, quantizer 19 and variable-length encoder 20, in the same way as for the DCT section 52, quantizer 53 and variable-length encoder 54.

Since the B frames are not used as reference frames for inter-picture prediction, the encoding system for the B frames does not contain any local decoding section.

In FIG. 5, the processing system for the I and P frames, and the processing system for the B frames, are respectively separate. However, since the processing which is performed by these is basically similar (following the subtraction stage), it would be equally possible to execute all of the processing by a single system, through appropriate time-sharing operation.

The code sequences obtained for the B frames are multiplexed by the multiplexer 13 with the code sequences derived for the I and P frames in a different order from that of the order of the frames of the original input video signal. That is to say, the order must be changed such as to ensure that the code sequence for each B frame will not be transmitted from the code output terminal 14 until after the code sequences for the I or P frames which were used in predictive encoding of that B frame have been transmitted.

A video decoding apparatus corresponding to the video encoding apparatus of FIG. 5 will be described in the following, referring to the system block diagram of FIG. 6. In FIG. 6, an input code stream (i.e., consisting of successive code sequences for respective I, P, B pictures which have been generated by the video encoding apparatus of FIG. 5) is supplied to a code input terminal 33, to be separated by a demultiplexer 34 into the code sequences for the I and P frames and the code sequences for the B frames.

The code sequences for the I and P frames are supplied to a variable-length decoder 62, to be restored to fixed code length format, then reconstructed prediction error values for a frame are derived by a dequantizer 75 and inverse DCT section 80, and added to predicted values for that frame by an adder 79, to obtain pixel values expressing reconstructed pictures, which are stored in a picture memory 63.

The inter-picture prediction section 64 generates prediction signals and supplies these to the adder 79 (in the case of the I and P frames) and to the adder 41 (in the case of the B frames). The inter-picture prediction section 64 differs in operation from the inter-picture prediction section 57 in that it does not perform motion estimation or prediction mode selection, and operates only in accordance with the transmitted information, so that the amount of processing which is executed is much less than that executed by the inter-picture prediction section 57.

The code sequences for the B frames are decoded by the variable-length decoder 38, dequantizer 39, and inverse DCT section 40 to obtain reconstructed prediction error values, which are added to the corresponding predicted pixel values by an adder 41, to thereby obtain reconstructed B frames.

The output selection switch 42 selects the values for the reconstructed I and P frames, read out from the picture memory 63, and the reconstructed B frames, produced from the adder 41, to be supplied to the picture output terminal 43. This is executed such that the order in which the sets of values for respective frames are supplied to the picture output terminal 43 is identical to the picture sequence of the original video signal (prior to encoding), rather than the order in which the encoded data sequences for the frames are output from the video encoding apparatus.

The pixel values for each frame are supplied to the output selection switch 42 from from the picture memory 63, or obtained from the adder 41, as a set of values for the first field followed by a set of values for the second field of the frame, so that an interlaced video signal is obtained from output terminal 43.

With a prior art type of interlaced video encoding apparatus, the problem arises that even if there is only a small amount of picture motion, it becomes impossible to perform accurate inter-picture prediction, due to the aliasing components which are contained in the interlaced picture signal. As mentioned above, even if there is only a parallel shift of the picture, a substantial amount of inter-picture prediction error will be produced. On the other hand, if all of the the interlaced pictures (i.e. each field of each frame) were to be converted to progressive scanning pictures (i.e. to respective progressive scanning frames) and then encoded, the above problem could be avoided. However since the total number of scanning lines of every picture would be doubled, the amount of encoding and decoding processing which must be executed would be correspondingly doubled, so that practical apparatus would be difficult.

It is an objective of the present invention to provide a video encoding apparatus and video encoding method, and a video decoding apparatus and video decoding method, and an encoding recorded medium, whereby the above problems of the prior art can be overcome.

A further problem which arises in the prior art is that when an interlaced video signal is obtained by reproduction from a recorded medium, or from a transmission source, the reconstructed interlaced pictures are not suitable for display by a progressive scanning type of monitor, such as is generally used to display text, images, etc., in the field of computers and data processing.

It is therefore a further objective of the present invention to provide a decoding apparatus, for operating on code which is generated by a video encoding apparatus according to the present invention as described above, whereby an output decoded video signal is obtained which is a progressive scanning video signal, and whereby each of the fields of the original interlaced video signal has been converted to a progressive scanning frame of the output video signal from the video decoding apparatus.

SUMMARY OF THE INVENTION

To overcome the problems of the prior art discussed above, the present invention provides a video encoding apparatus and method, and corresponding video decoding apparatus and method whereby an interlaced video signal can be encoded and subsequently decoded as a series of code sequences expressing pictures which have been respectively encoded either by intra-picture encoding (i.e., I pictures), by unidirectional predictive encoding (i.e., P pictures) or by bidirectional predictive encoding (i.e. the B pictures), which differs from the prior art in that:

(a) The I, P and B pictures are selected in units of fields of the interlaced video signal, rather than frames, and (b) Each of the fields which is selected as an I or P picture, i.e. which is utilized as a reference picture in prdictive encoding, is converted to a progressive scanning frame, having twice the number of scanning lines of the fields of the original video signal.

That is to say, improved prediction is achieved by periodically selecting specific fields of an interlaced video signal to be converted to respective progressive scanning frames, performing encoding and decoding of each such progressive scanning frame by independent encoding or by unidirectional predictive encoding, while leaving the remaining fields unchanged as interlaced scanning fields, and performing bidirectional predictive encoding and decoding of such interlaced scanning fields by using preceding and succeeding progressive scanning frames as reference frames.

As a result, since the number of scanning lines of each field selected as a B picture for encoding is left unchanged, the conversion of the I and P pictures to progressive scanning frames does not result in an excessive amount of code being generated. However the encoding distance (i.e., between each frame or field which is encoded and the progressive scanning frames which are used as reference pictures for that encoding) can thereby be effectively halved, by comparison with prior art methods, a substantially improved combination of encoding efficiency and accuracy of motion prediction can be achieved than has been possible in the prior art.

More specifically, according to a first aspect the invention provides a video encoding apparatus for encoding an interlaced video signal, comprising progressive scanning conversion means for converting one field of every m fields (where m is an integer of value 2 or greater) of said interlaced video signal to a single progressive scanning frame which has twice the scanning line density of an interlaced field, while leaving the remaining fields unchanged as interlaced scanning fields, first encoding means for encoding each said progressive scanning frame either by independent internal encoding of the frame or by unidirectional predictive encoding based on progressive scanning frames which have been encoded, and second encoding means for performing predictive encoding of each remaining field of said video signal other than said fields which are converted to progressive scanning frames, using, as reference frames for said predictive encoding, selected ones of said progressive scanning frames which precede and succeed said each remaining field along the time axis.

Such a video encoding apparatus comprises inter-picture prediction means for deriving prediction signal values based on said progressive scanning frames which have been encoded, and said second encoding means comprises decimation means for receiving from said inter-picture prediction means, in synchronism with execution of encoding processing for said each remaining field, a set of prediction signal values derived based on said preceding and succeeding progressive scanning frames, executing decimation processing of said set to remove all prediction signal values other than sub-sets of prediction signal values which respectively corresponding to scanning lines of said each remaining field, and using remaining ones of said prediction signal values of the set in said predictive encoding of said each remaining field.

According to a second aspect, the invention provides a video decoding apparatus for executing decoding of successive code sequences which have been generated by encoding of progressive scanning frames derived by doubling the scanning line density of one in every m fields of an original interlaced video signal (where m is an integer of 2 or greater), with the encoding process using intra-frame predictive encoding or unidirectional predictive encoding, and by encoding remaining fields of said video signal directly as interlaced scanning fields, with the encoding process using bidirectional predictive encoding based on preceding and succeeding ones of said progressive scanning frames, the video decoding apparatus comprising:

first decoding means for decoding each of said code sequences corresponding to said progressive scanning frames by intra-frame decoding of said code sequence or by unidirectional predictive decoding of said code sequence using decoded ones of said progressive scanning frames, second decoding means for performing bidirectional predictive decoding of respective code sequences corresponding to each of said fields which have been encoded as interlaced scanning fields, using as reference frames decoded ones of said progressive scanning frames which precede and succeed the field corresponding to said code sequence along the time axis, and picture reconfiguration means for performing decimation of scanning lines of each of the progressive scanning frames which have been decoded by the first decoding means, to obtain a converted field having the same number of scanning lines as an interlaced scanning field, and executing time-axis combination of respective ones of said converted fields with said fields which are derived by said second decoding means, in an appropriate sequence for reproducing said original interlaced video signal.

Such a video decoding apparatus comprises inter-picture prediction means for deriving prediction signal values based on decoded ones of said progressive scanning frames, while said second encoding means comprises decimation means for:

receiving from said inter-picture prediction means, in synchronism with execution of said decoding processing for a field which was encoded as an interlaced scanning field, a set of prediction signal values derived based on said decoded preceding and succeeding progressive scanning frames, executing decimation processing of said set to remove all prediction signal values other than sub-sets of prediction signal values which respectively correspond to scanning lines of said field, and applying remaining ones of said prediction signal values of the set in said predictive decoding of the code sequence corresponding to said field.

According to a third aspect, the invention provides a video decoding apparatus for executing decoding of encoded progressive scanning frames derived by doubling the scanning line density of one in every m fields of an interlaced video signal (where m is an integer of 2 or greater), with the encoding process using intra-frame encoding or unidirectional predictive encoding, and encoding of remaining fields of said video signal directly as interlaced scanning fields, the video decoding apparatus comprising decoding means for decoding each of said encoded progressive scanning frames by intra-frame decoding or by unidirectional predictive decoding using decoded ones of said progressive scanning frames, to thereby obtain a first series of reconstructed pictures, prediction error decoding means for decoding of prediction error values for each of said remaining fields which are encoded as interlaced scanning fields, interpolation means for performing over-sampling of said prediction error values in a vertical scanning direction of a field, to derive reconstructed prediction error values corresponding to scanning lines of progressive scanning frames, inter-picture prediction means for deriving prediction signal values for each of said fields which were encoded unchanged as interlaced scanning fields, using a preceding one and a succeeding one of said first series of reconstructed pictures as reference frames, adder means for adding to said prediction signal values said reconstructed prediction error values corresponding to progressive scanning lines, to thereby obtain a second series of reconstructed pictures, and picture reconfiguration means for inserting said second series of reconstructed pictures into said first series of reconstructed pictures to obtain a reconstructed video signal in which all pictures are expressed as progressive scanning frames.

According to a fourth aspect, the invention provides an encoded video recorded medium having recorded thereon code expressing interlaced video information which has been encoded by high-efficiency encoding of an interlaced video signal, said encoding being characterized in that:

one in every m fields of said interlaced video signal (where m is an integer of 2 or greater) is converted to a progressive scanning frame having double the number of scanning lines while remaining fields are left unchanged as interlaced scanning fields, each of the progressive scanning frames is either independently internally encoded or is encoded by unidirectional prediction encoding using as reference frames progressive scanning frames which have already already been encoded, to thereby obtain respective first code sequences corresponding to said progressive scanning frames, each of the remaining fields which are left unchanged as interlaced scanning fields is encoded by bidirectional prediction using preceding and succeeding ones of the encoded progressive scanning frames as reference frames, to thereby obtain a respective second code sequences corresponding to said remaining fields, and said first and second code sequences are recorded to constitute said encoded video recorded medium.

According to a fifth aspect, the invention provides a method of encoding an interlaced video signal, comprising:

converting one field of every m fields (where m is an integer of value 2 or greater) of said interlaced video signal to a single progressive scanning frame which has twice the scanning line density of an interlaced field, while leaving remaining fields of said video signal unchanged as interlaced scanning fields, encoding each said progressive scanning frame either by independent internal encoding of the frame or by unidirectional predictive encoding based on progressive scanning frames which have been encoded, and performing bidirectional predictive encoding of each the remaining fields of said video signal other than said fields which are converted to progressive scanning frames, using, as reference frames for deriving respective sets of prediction signal values corresponding to each of said remaining fields, selected ones of said progressive scanning frames which precede and succeed said each remaining field along the time axis.

With such a method decimation processing is applied to each of said sets of prediction signal values to remove respective sub-sets of prediction signal values which do not correspond to scanning lines of said each remaining field, to thereby obtain a set of prediction signal values for use in predictive encoding of said each remaining field.

According to a sixth aspect, the invention provides a method of decoding successive code sequences which have been generated by a first encoding process applied to respective progressive scanning frames which have been derived by doubling the scanning line density of one in every m fields of an original interlaced video signal (where m is an integer of 2 or greater), with the first encoding process using intra-frame predictive encoding or unidirectional predictive encoding, and by encoding remaining fields of said video signal directly as interlaced scanning fields in a second encoding process, with the second encoding process using bidirectional predictive encoding based on preceding and succeeding ones of said progressive scanning frames, with the video decoding method comprising:

executing decoding each of respective code sequences corresponding to each of said progressive scanning frames by intra-frame decoding of said code sequence or by unidirectional predictive decoding of said code sequence using decoded ones of said progressive scanning frames, executing predictive decoding of respective code sequences corresponding to each of said fields which have been encoded as interlaced scanning fields, using as reference frames decoded ones of said progressive scanning frames which precede and succeed the field corresponding to said code sequence along the time axis, performing decimation of scanning lines of each of the progressive scanning frames which have been decoded by the first decoding means, to obtain a converted field having the same number of scanning lines as an interlaced scanning field, and combining respective ones of said converted fields and said fields which are derived by said second decoding means, along the time axis, in an appropriate sequence for reproducing said original interlaced video signal.

With such a method, the predictive decoding of a code sequence corresponding to a field which has been encoded as interlaced scanning fields is performed by deriving a set of prediction signal values based on decoded progressive scanning frames which precede and succeed said field along the time axis, executing decimation processing of said set to remove all prediction signal values other than sub-sets of prediction signal values which respectively correspond to scanning lines of said field, and applying remaining ones of said set of prediction signal values in said predictive decoding of the code sequence corresponding to said field.

According to a seventh aspect, the invention provides a method of decoding successive code sequences which have been generated by encoding respective progressive scanning frames derived by doubling the scanning line density of one in every m fields of an original interlaced video signal (where m is an integer of 2 or greater), with the encoding process using intra-frame encoding or unidirectional predictive encoding, and by encoding remaining fields of said video signal directly as interlaced scanning fields, the decoding method comprising:

decoding each of said progressive scanning frames by intra-frame decoding or by unidirectional predictive decoding using previously decoded ones of said progressive scanning frames, to thereby obtain a first series of reconstructed pictures, decoding respective sets of prediction error values for each of said remaining fields which are encoded as interlaced scanning fields, performing over-sampling of said prediction error values in a vertical scanning direction of a field, to generate reconstructed prediction error values corresponding to scanning lines of a progressive scanning frame, deriving, for said each field which was encoded as an interlaced scanning field, prediction signal values based on selected ones of said first series of progressive scanning frames which precede and succeed said each field along the time axis, as reference frames, adding said prediction signal values to said reconstructed prediction error values, to thereby obtain a second series of reconstructed pictures, and inserting said second series of reconstructed pictures into said first series of reconstructed pictures to obtain a reconstructed video signal in which all pictures are expressed as progressive scanning frames.

As a result, the present invention can provide a video encoding method and apparatus and video decoding method and apparatus whereby an interlaced video signal can be encoded with a very high level of encoding efficiency, and furthermore whereby the resultant code, after having been transmitted and received, or recorded and reconstructed, can be decoded to recover the original video signal as an interlaced signal, or as a progressive scanning video signal in which each field of the originally encoded video signal has been converted to a progressive scanning frame (having double the number of scanning lines of an interlaced field) which can be directly displayed by various types of data processing display apparatus, etc., that can only utilize a progressive scanning video signal.

DESCRIPTION OF PREFERRED EMBODIMENTS

Figure 1:
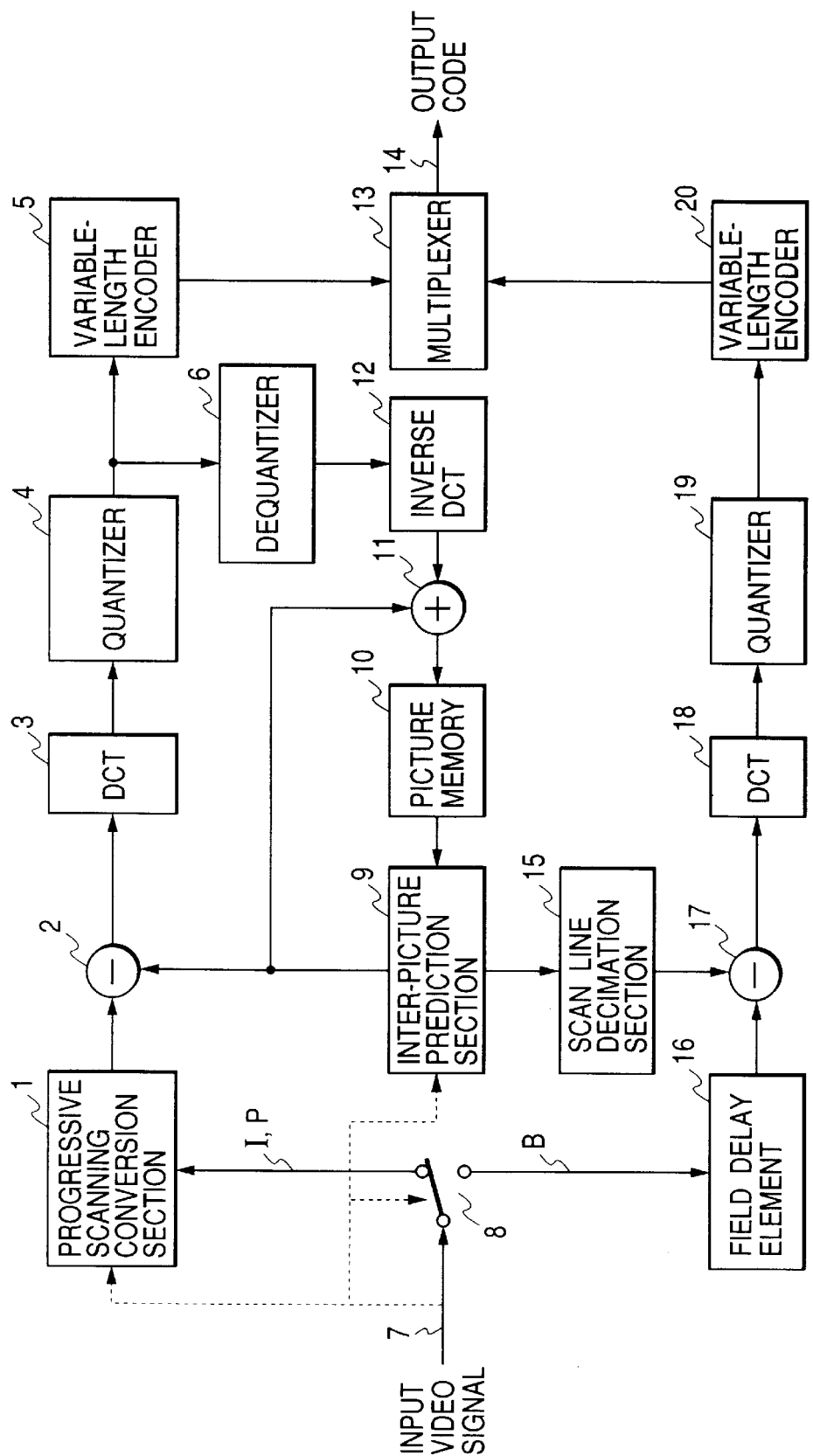
FIG. 1 is a general system block diagram of an embodiment of a video encoding apparatus according to the present invention.
Figure 5:
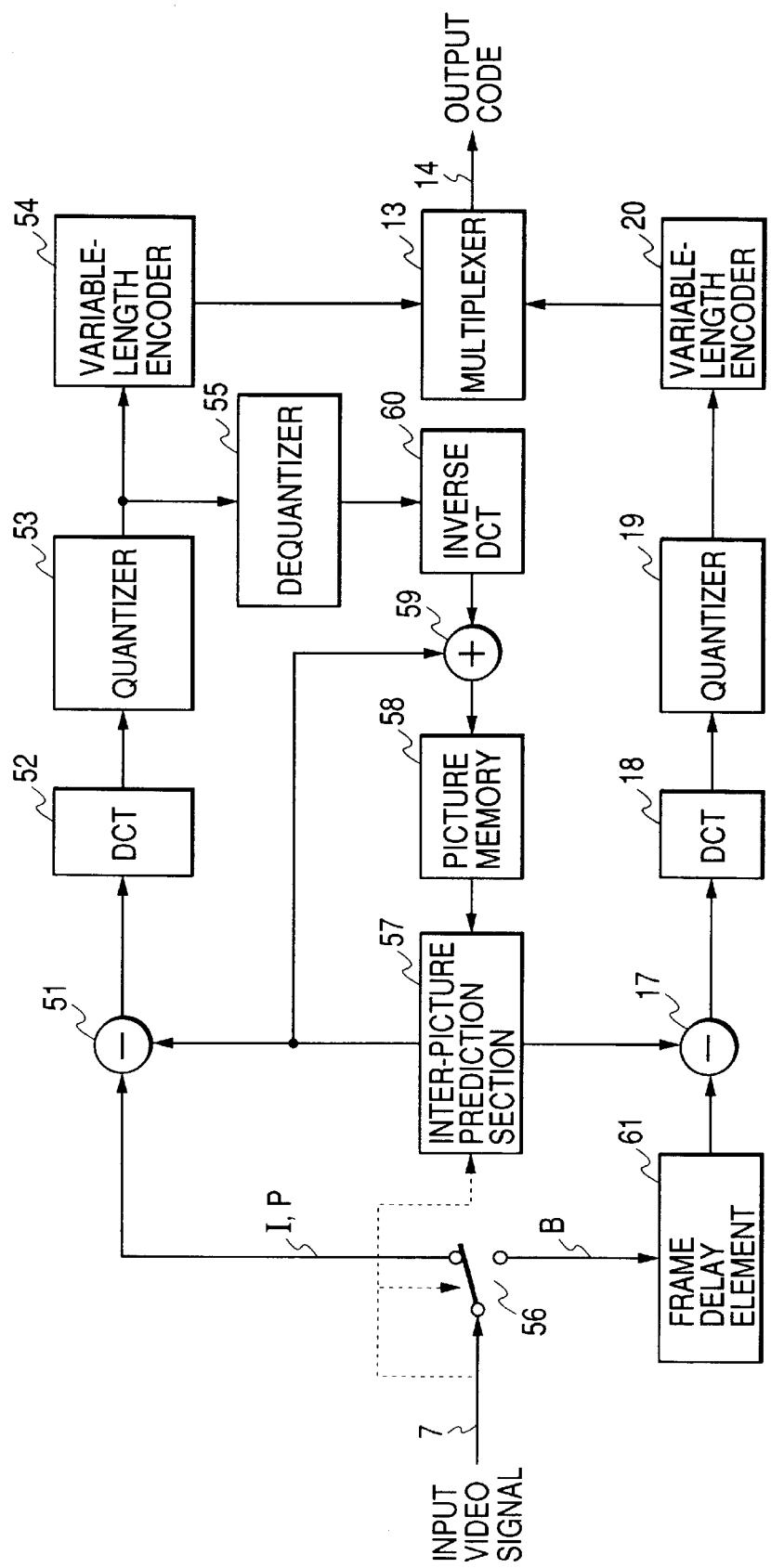
FIG. 5 is a general system block diagram of an example of a prior art type of video encoding apparatus.

An embodiment of a motion-compensation encoding apparatus according to the present invention will be described in the following referring to the system block diagram of FIG. 1. In FIG. 1, elements that are identical in function and operation to elements of the prior art video encoding apparatus example of FIG. 5 are designated by identical numerals to those of FIG. 5. Basically, the apparatus of FIG. 1 differs from that of FIG. 5 by including a progressive scanning conversion section 1 and scanning line decimation section 15. Also, the frame delay element 61 of the prior art apparatus of FIG. 5 is changed to a field delay element 16, and the operation of the input signal selection switch 8 and of the inter-picture prediction section 9 respectively differ from those of the input signal selection switch 56 and inter-picture prediction section 57 of the prior art video encoding apparatus example of FIG. 5.

The processing executed with this embodiment will be described by comparison with that of the prior art video encoding apparatus example of FIG. 5. With this embodiment, the picture processing units are respective fields of the input interlaced video signal which is supplied to the video signal input terminal 7, and the picture type (i.e., I, P, B) is also established in units of these interlaced fields. Thus, the time-axis separation between successive I, P or B pictures is the field period, e.g., 1/60 second.

The major features of this embodiment are as follows. The fields of the input video signal which are to be processed as I and P type pictures are each subjected to conversion processing to increase the scanning line density, i.e. interpolation of scanning lines is performed to double the number of scanning lines per field and thereby achieve conversion to progressive scanning frames. The fields of the input video signal which are to be processed as B type pictures are left unchanged, i.e. are encoded in units of fields, in a similar manner to that described for the B type fields of the prior art example of FIG. 5.

Figure 2:
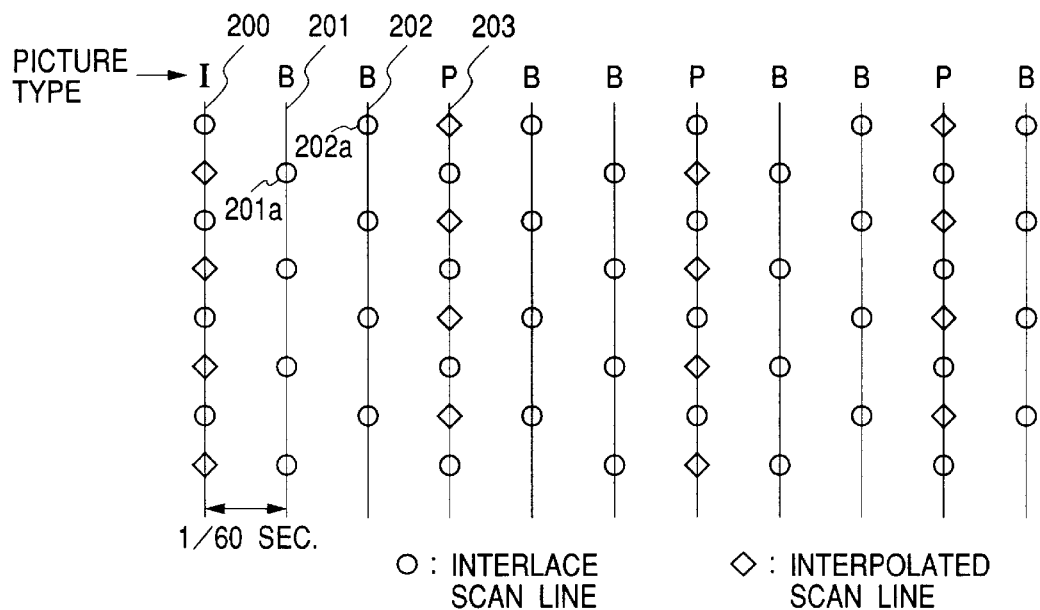
FIG. 2 is a conceptual diagram for illustrating the relationships between the scanning line configurations of successive I, P progressive scanning frames and B fields which are encoded by the embodiment of FIG. 1.

FIG. 2 shows the arrangement of scanning lines of the resultant picture types. With a standard resolution television system, the effective number of scanning lines is 480 lines per frame, 240 lines per field. Since each of the I and P type pictures is converted to have twice the number of scanning lines of the original fields, the amount of encoding processing which must be executed for each of these is accordingly doubled.

Encoding of the I and P progressive scanning frames is not executed as for the prior art example, i.e. based on the two fields/frame configuration. Instead, as can be clearly understood from the scanning line configuration illustrated in FIG. 2, prediction is executed for each P type progressive scanning frame based on a preceding I type or P type progressive scanning frame, and is executed for each B type field based on preceding and succeeding ones of the I type or P type progressive scanning frames. It can thus be seen that the encoding processing can be simplified by comparison with the prior art method of the example of FIG. 5.

In the case of the prediction processing which is applied to each interlaced scanning field which is to be encoded as a B field, the operation is as follows. A set of prediction signal values is generated by the inter-picture prediction section 9, (in synchronism with input to the subtractor 17 of the pixel values for the field which is to be encoded) based upon specific I or P progressive scanning frames which succeed and precede that interlaced field. Since that set has been derived using progressive scanning frames, it contains twice the number of prediction signal values that are required for encoding an interlaced field, i.e. the set includes respective sub-sets of values which correspond to scanning lines that are omitted from the interlaced field. For that reason, each such set of prediction signal values is subjected to decimation processing by the scanning line decimation section 15, to eliminate each of these sub-sets of prediction signal values corresponding to respective scanning lines which do not appear in the field which is being encoded.

It will be apparent that this operation of the scanning line decimation section 15 must be controlled in accordance with whether the field which is being encoded contains the even-numbered or odd-numbered scanning lines of an interlaced scanning frame, so that appropriate sub-sets of prediction signal values will be eliminated. That is to say the scanning line decimation section 15 must extract, from a set of prediction signal values supplied from the inter-picture prediction section 9, those values which match the scanning lines of the field which is to be encoded. However since it is inherently necessary for various types of prior art apparatus which operate on an interlaced video signal to include means for discriminating between the even and odd number fields (i.e, the first and second fields of a frame) based on the synchronizing signals contained in an interlaced video signal and to control the operation of the apparatus in accordance with whether an even or odd number field is being processed, so that the technology is extremely well-known, detailed description of such discrimination and control operation will be omitted.

Referring to FIG. 2, for example, assuming that the I and P progressive scanning frames designated by numerals 200, 203 are used to derive prediction signal values for encoding the interlaced scanning field 201 as a B field, the first scanning lines of the fields 201, 202 being indicated as 201a, 202a, then the result of the operation of the inter-picture prediction section 9 and scanning line decimation section 15 will be as follows. Of a complete set of prediction signal values which are generated by the inter-picture prediction section 9 (i.e., a set which would be appropriate for encoding a progressive scanning frame) allsub-sets which correspond to scanning lines that do not occur in the field 201 are eliminated by the scanning line decimation section 15.

It will be apparent that with such a method, the the problems which arise in the prior art when performing such encoding due to the 1-line vertical displacement and 1-field period time-axis displacement between the two interlaced fields of an I frame or a P frame, can be eliminated.

The operation of the input selection switch 8 is synchronized with successive fields of the input video signal. As mentioned above, the technology relating to such control is very well known, so that detailed description of specific switch control apparatus is omitted.

Typically, values for m in the range 3 to 6 are appropriate, i.e., values which are larger than those used in the prior art, and the proportion of I frames in the overall stream of I, P, B pictures can be made accordingly greater than is possible with prior art methods, without making the prediction distance excessively large, so that the amount of encoded data can be substantially reduced by comparison with the prior art. Conversely, if for example the same value m were to used as for the prior art example, then the prediction distance would be halved, by comparison with the prior art example, so that an according increase in motion prediction accuracy would be obtained.

The progressive scanning conversion section 1 can be configured as shown in Japanese Patent Laid-open No. HEI 8-130716, whereby motion prediction is performed in units of small blocks, using preceding and succeeding fields, with interpolation of scanning lines which have been omitted from a field due to the interlaced scanning. Since the contents (i.e., pixel values) of preceding and succeeding interlaced fields are required for this interpolation operation, it will be understood that the progressive scanning conversion section 1 includes any necessary delay elements for achieving this, such as a field memory.

The operation of each of the subtractor 2, the DCT section 3, the quantizer 4, and the variable-length encoder 5 is basically identical to that of the corresponding element of the prior art example. However since there is 1 progressive scanning frame in each field period of the original video signal, e.g., 1/60 second, it is necessary to execute processing at twice the speed of the prior art example, if real-time processing is to be achieved.

The same is also true for the operation of the dequantizer 6, the inverse DCT section 12 and the adder 11 which constitute the local decoding section. The operating speed of the picture memory 10 is the same as that of the inverse DCT section 12, however the memory capacity is the same as that of the prior art example. That is to say, with the prior art example there are two interlaced fields per I frame or P frame whereas with the present invention each I frame or P frame is a single progressive scanning frame having twice the number of scanning lines of an interlaced field.

With the present invention, since the inter-picture prediction section 9 can execute processing simply in units of progressive scanning frames, the operation can be simpler than for the prior art example. Specifically, motion estimation is performed within the inter-picture prediction section 9 by operating on blocks of 16×16 pixels or 8×8 pixels, and motion compensation is executed in accordance with the detected motion vectors. In general, the accuracy of motion compensation is to within ½ of a pixel.

In the case of the B fields, a delay of (m−1) fields must be applied to the picture signal by the field delay element 16. Since the picture types (i.e., I, P, B) are established in units of interlaced scanning fields of the input video signal as described above, the delay applied by the field delay element 16 is set in units of field periods. However in addition, for the the progressive scanning conversion section 1 to perform inter-field interpolation for generating the I and P progressive scanning frames, a delay of one field must occur between inputting video signal values for a field to the progressive scanning conversion section 1 and output of resultant video signal values for a progressive scanning frame. Thus, it is necessary to apply a corresponding amount of delay to the B fields to compensate for this. As a result, the total delay applied by the field delay element 16 must be m field periods (e.g., m/60 seconds).

The operation of each of the subtractor 17, DCT section 18, quantizer 19 and variable-length encoder 20 is basically identical to that of the prior art example, but with processing being executed in units of fields. That is to say, as described above, the prediction signal which is supplied to the subtractor 17 to derive difference values (i.e., values of prediction error) for a B field is derived from preceding and succeeding I or P progressive scanning frames which are separated from that B field by one or more field periods.

It will be understood that such a form of operation is basically different from the prior art in that, since the picture types (i.e., I, P, B) are established in units of fields, isolated I pictures and P pictures will occur as shown in FIG. 2. However with a prior are method such as that of the apparatus of FIG. 5, pairs of I pictures (expressed as interlaced fields) will occur consecutively, as will pairs of P pictures.

In FIG. 1, the processing system that is constituted by the subtractor 2, the DCT section 3, the quantizer 4 and the variable-length encoder 5 is configured separately from the processing system that is constituted by the subtractor 17, DCT section 18, quantizer 19 and variable-length encoder 20. However, since the processing executed by these two systems is basically the same, these could be combined into a single system, through use of time-sharing operation.

Figure 4:
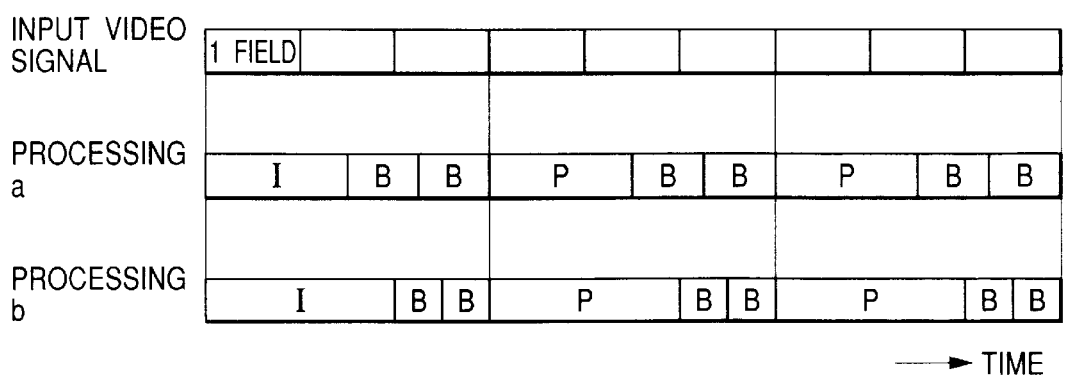
FIG. 4 is a conceptual diagram for illustrating the relative amounts of encoding processing time periods which are available for the I, P and B pictures respectively, if the video encoding apparatus embodiment of FIG. 1 were to be modified to use a single encoding system in common for encoding the I, P and B pictures by time-sharing operation.

In that case, since the amount of processing required for an I frame or P frame is double the amount of processing required for a B field, the relationships between the processing timings for encoding the I, P and B fields could be as shown conceptually in the example designated as "Processing a", in FIG. 4. As shown, since the processing time intervals required for each of the I and P frames is twice that required for a B field, it is necessary to make the processing time for a B field shorter than a field period (e.g., shorter than 1/60 second). With the example shown, assuming a value of 3 for m, the encoding processing for each B field must be completed within 0.75 of a field period, while the encoding processing for each I or P field must be completed within 1.5 field periods.

On the other hand, as shown in Japanese Patent Laid-open No. HEI 6-311505, subsampling of the prediction error values obtained for the B fields can be applied, to halve the amount of processing performed by the stages which succeed the DCT section 18. In that case, again assuming that a value of 3 is used for m, then as indicated by the "Processing b" example in FIG. 4, real-time encoding processing of the I and P fields becomes possible, i.e., two field periods are available for executing such processing, in the same way as for the configuration of FIG. 1.

As a specific configuration, a subsampler operating along the horizontal direction of each B field can be inserted between the subtractor and the DCT section of such a combined configuration (i.e. which respectively perform the functions of the subtractors 2, 17 and the DCT sections 3, 18 in the embodiment of FIG. 2).

Figure 3:
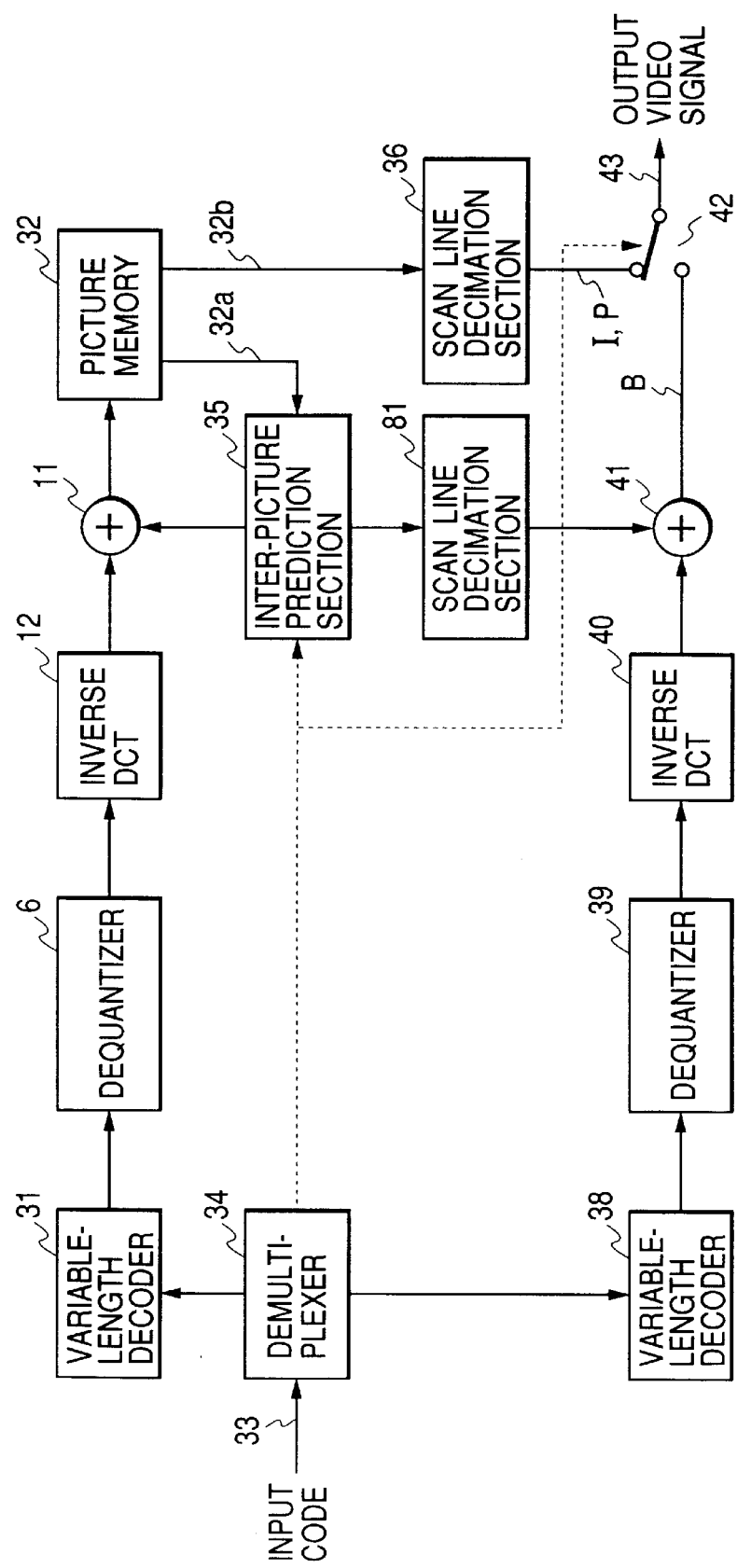
FIG. 3 is a general system block diagram of a first embodiment of a video decoding apparatus according to the present invention, for use in conjunction with the video encoding apparatus of FIG. 1.

FIG. 3 shows an embodiment of a video decoding apparatus corresponding to the video encoding apparatus of FIG. 1 for decoding the output code generated by that video encoding apparatus, e.g., when transmitted code is received or recorded code is reconstructed.

Figure 6:
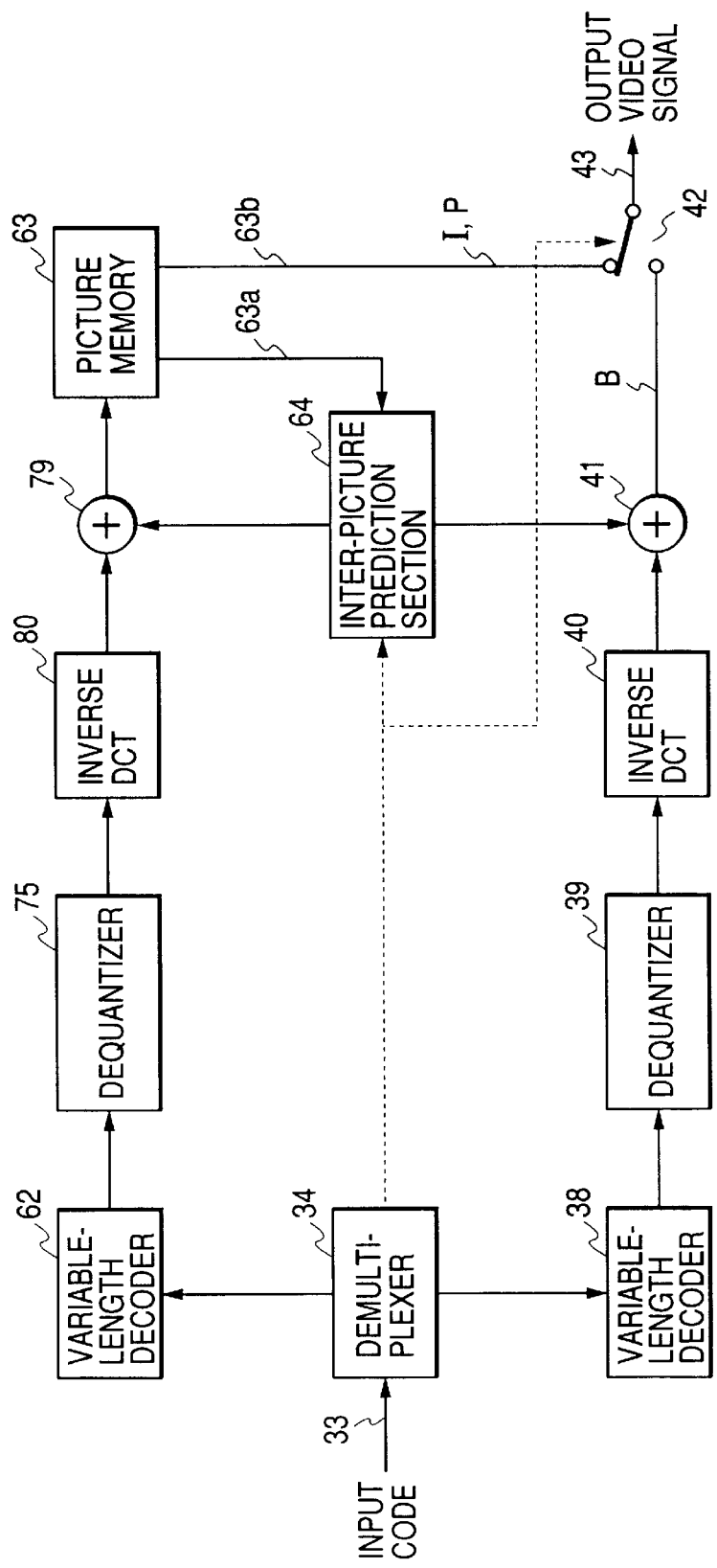
FIG. 6 is a general system block diagram of an example of a prior art type of video decoding apparatus for use in conjunction with the video encoding apparatus of FIG. 5.

In FIG. 3, elements that are identical to elements of the prior art example of FIG. 6 are designated by identical numerals. The configuration of FIG. 3 differs from that of the prior art example of FIG. 6 by including scanning line decimation sections 81 and 36. Also, the operation of the inter-picture prediction section 35 differs from that of the prior art example of FIG. 6, while in addition the processing executed by each of the variable-length decoder 31, the dequantizer 6, the inverse DCT section 12 and the adder 11 with respect to the I and P pictures is in units of progressive scanning frames.

The code which is input from the code input terminal 33 is separated by the demultiplexer 34 into the I and P frame code sequences and the B frame code sequences. The I and P frame code sequences are subjected to decoding processing by the variable-length decoder 31, the dequantizer 6, the inverse DCT section 12 and the adder 11, in the same way as for the prior art example of FIG. 6, to thereby obtain sets of pixel values for reconstructed pictures expressed as respective progressive scanning frames, which are then stored in a picture memory 32.

To achieve complete real-time processing, it is necessary that processing of each progressive scanning frame be completed within one field period, e.g., 1/60 second.

The inter-picture prediction section 35 generates a prediction signal (expressing successive reconstructed prediction error values) based on the decoded progressive scanning frames stored in the memory 32, supplies this to the adder 11 for deriving pixel values for reconstructed I and P progressive scanning frames, and supplies a prediction signal to scanning line decimation section 81 for use in decoding the B fields. The inter-picture prediction section 35 operates in a basically similar manner to the inter-picture prediction section 9 of FIG. 1. However the inter-picture prediction section 35 differs from the inter-picture prediction section 9 in that it does not perform motion estimation or prediction mode selection. Thus the amount of processing performed by the inter-picture prediction section 35 is substantially less than that executed by the inter-picture prediction section 9.

The B-picture code sequences supplied from the demultiplexer 34 (which correspond to respective interlaced-scanning fields, as described above referring to FIG. 1) are decoded by the variable-length decoder 38, the dequantizer 39, the inverse DCT section 40 and by addition of prediction signal values in the adder 41, to obtain respective reconstructed B field signals (i.e., successive reconstructed pixel values for the B fields).

The operation of the scanning line decimation section 81 of this embodiment in selecting appropriate sets of prediction signal values from those generated by the inter-picture prediction section 35, in relation to the scanning lines of the B fields which are to be decoded, is identical to that of the scanning line decimation section 15 of FIG. 1, which has been described in detail hereinabove. As a result of supplying these prediction signal values to the adder 41 in conjunction with decoded prediction error values for each B field which are output from the inverse DCT section 40, respective sets of reconstructed pixel values expressing these B fields are obtained, i.e. the corresponding interlaced fields of the original video signal are thereby obtained from the adder 41, and supplied to the output selection switch 42.

In addition, sets of reconstructed pixel values corresponding to respective I, P progressive scanning frames are read out from the picture memory 32, via the output lines designated as 32b in FIG. 3. Each of these sets is supplied to the scanning line decimation section 36, which eliminates specific sub-sets of pixel values which correspond to scanning lines that must be omitted in order to convert a progressive scanning frame to an appropriate (i.e. odd-numbered or even-numbered) interlaced scanning field. The values expressing that field are then supplied to the output selection switch 42.

The output selection switch 42 is controlled, in conjunction with control of read out of values from the picture memory 32, to transfer the sets of values for reconstructed fields which have been derived from the I and P progressive scanning frames and the sets of values for the reconstructed B fields to the video output terminal 43 in the same order of interlaced scanning fields as that of the original video signal prior to encoding. A reconstructed output interlaced video signal is thereby obtained, with the fields having been restored to the time-axis order of the original video signal, rather than that of the code sequences representing respective I, P and B pictures which are output from the video encoding apparatus of FIG. 1.

It should be noted that the scanning line decimation sections 81 and 36 perform processing which differs from subsampling processing in that no filter processing is executed prior to the decimation operation. This is because the reconstructed progressive scanning pictures are derived from original interlaced pictures which have been converted to progressive scanning form, so that the vertical scanning frequency characteristic is already limited to a degree that is appropriate for an interlaced signal, prior to the decimation processing.

As can be understood from the above description, the video decoding apparatus embodiment of FIG. 3, in combination with the video encoding apparatus embodiment of FIG. 1, enables a system for transmitting or recording an interlaced video signal as encoded data with a very high encoding efficiency. This results from the following reasons. Since the I, P and B pictures respectively corresponding to fields (of the original interlaced video signal), rather than units of 2-field frames, if the relative proportions of I, P and B pictures were to be made identical to that of used with a prior art system such as that of FIGS. 5, 6, the encoding distance (e.g., as represented by the time-axis separation between pictures selected as I pictures) would be halved, and the motion prediction accuracy accordingly doubled. Alternatively stated, with the present invention it would be possible to double the proportion of B pictures in relation to the I and P pictures, while maintaining the same level of prediction accuracy. Since the amount of code that is generated for a B picture is less than that for a P picture, and very much less than that for an I picture, enhanced encoding efficiency can be achieved.

In a similar manner to that described hereinabove for the video encoding apparatus of FIG. 1, it would be possible to modify the video decoding apparatus of FIG. 3 to perform processing of both the I and P progressive scanning frames and also the B fields by a single system, through appropriate time-sharing operation. In that case, the apparatus could be configured to perform sub-sampling of the reconstructed prediction error values for the B fields, by inserting a subsampler operating along the horizontal direction of each field, i.e. with the subsampler being inserted (during each interval in which a B field is being decoded) between the inverse DCT section that would be used in common for decoding I, P and B pictures and the adder which receives the output values from that inverse DCT section. In that way it would become possible to increase the time available for decoding each of the I and P progressive scanning frames, in the same manner as described above referring to FIG. 4 for the case of encoding processing.

Figure 7:
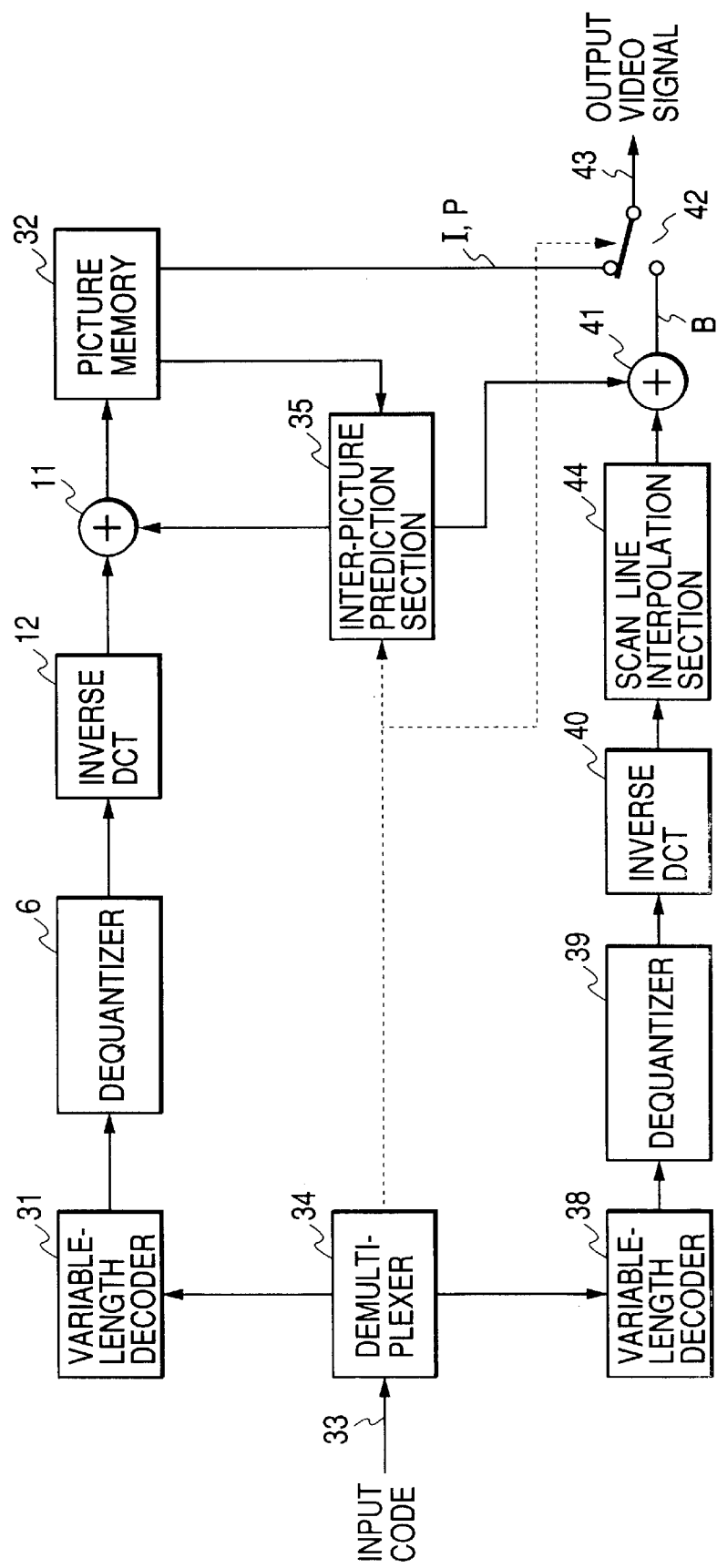
FIG. 7 is a general system block diagram of a second embodiment of a video decoding apparatus according to the present invention, for use in conjunction with the video encoding apparatus of FIG. 1, whereby an encoded field-interlaced type of video signal is converted by the encoding/decoding process to a progressive scanning video signal.

FIG. 7 shows a second embodiment of a decoding apparatus for operating on the encoded video data generated by the encoding apparatus of FIG. 1. In FIG. 7, elements that are identical to elements of the prior art example of FIG. 6 are designated by identical numerals. The configuration of FIG. 7 differs from that of the prior art example of FIG. 6 by including a scanning line interpolation section 44, while in addition the operation of the inter-picture prediction section 35 differs from that of the prior art example of FIG. 6, and furthermore the processing executed by each of the variable-length decoder 31, the dequantizer 6, the inverse DCT section 12 and the adder 11 with respect to the I and P pictures is in units of progressive scanning frames, in the same way as for the video decoding apparatus embodiment of FIG. 3 described above.

The code which is input from the code input terminal 33 is separated by the demultiplexer 34 into the I and P frame code sequences, i.e., for respective progressive scanning frames, and the B field code sequences, for respective interlaced scanning fields. The I and P frame code sequences are subjected to decoding processing by the variable-length decoder 31, the dequantizer 6, the inverse DCT section 12 and the adder 11, in the same way as for the prior art example of FIG. 6, to thereby obtain sets of reconstructed pixel values expressing respective I and P progressive scanning frames, which are stored in the picture memory 32.

To achieve complete real-time processing, it is necessary that the decoding processing of each progressive scanning frame be completed in one field period (e.g., 1/60 second).

The inter-picture prediction section 35 generates a prediction signal in the same way as described for the embodiment of FIG. 3, based on the progressive scanning frames stored in the memory 32, and supplies this to the adder 11 for deriving pixel values for the reconstructed I and P progressive scanning frames. In addition, the inter-picture prediction section 35 supplies a prediction signal to the adder 41, for deriving pixel values for reconstructed progressive scanning frames which are obtained from decoded B fields as described in the following.

The B frame code sequences are decoded by the variable-length decoder 38, the dequantizer 39 and the inverse DCT section 40 to obtain respective sets of reconstructed prediction error values for the B fields, i.e., this processing is performed in units of interlaced scanning fields. Each set of reconstructed prediction error values thereby obtained for a field is then subjected to scanning line interpolation (oversampling) in the vertical direction by the scanning line interpolation section 44, to obtain a corresponding set of reconstructed prediction error values for a progressive scanning frame. That is to say, the set of prediction error values corresponding to a 240 line field is converted to a set of prediction error values corresponding to a 480 line progressive scanning frame, by generation and insertion of 240 sub-sets of interpolated prediction error values which correspond to respective interpolated scanning lines, before being supplied to the adder 41.

This processing is executed within each field by oversampling, and is a simple form of processing by comparison with that executed by the progressive scanning conversion section 1 of the video encoding apparatus of FIG. 1.

The prediction signal values which are output from the inter-picture prediction section 35 are added, in the adder 41, to the prediction error values which have been converted to progressive scanning frame format by the scanning line interpolation section 44, to thereby obtain sets of reconstructed pixel values for respective progressive scanning frames that have been derived from decoded B fields.

The output selection switch 42 receives the pictures expressed as respective reconstructed I and P progressive scanning frames which are read out from the picture memory 32 at appropriate timings (as described for the embodiment of FIG. 3 and the pictures expressed as respective progressive scanning frames derived from the B fields which are output from the adder 41, and outputs these progressive scanning frames to the video output terminal 43 in the appropriate order for producing a progressive scanning video signal in which the sequence of the progressive scanning frames is identical to that of the originally encoded interlaced video signal and in which the frame period is half of the frame period of that original video signal. That is to say, in the same way as described for the embodiment of FIG. 3, the order in which data expressing respective reconstructed pictures are supplied to the video output terminal 43 is identical to the time-axis order of the respectively corresponding pictures (expressed by interlaced fields) of the original video signal, rather than that of the I, P, B code sequences which are received by the video decoding apparatus.

Figure 8:
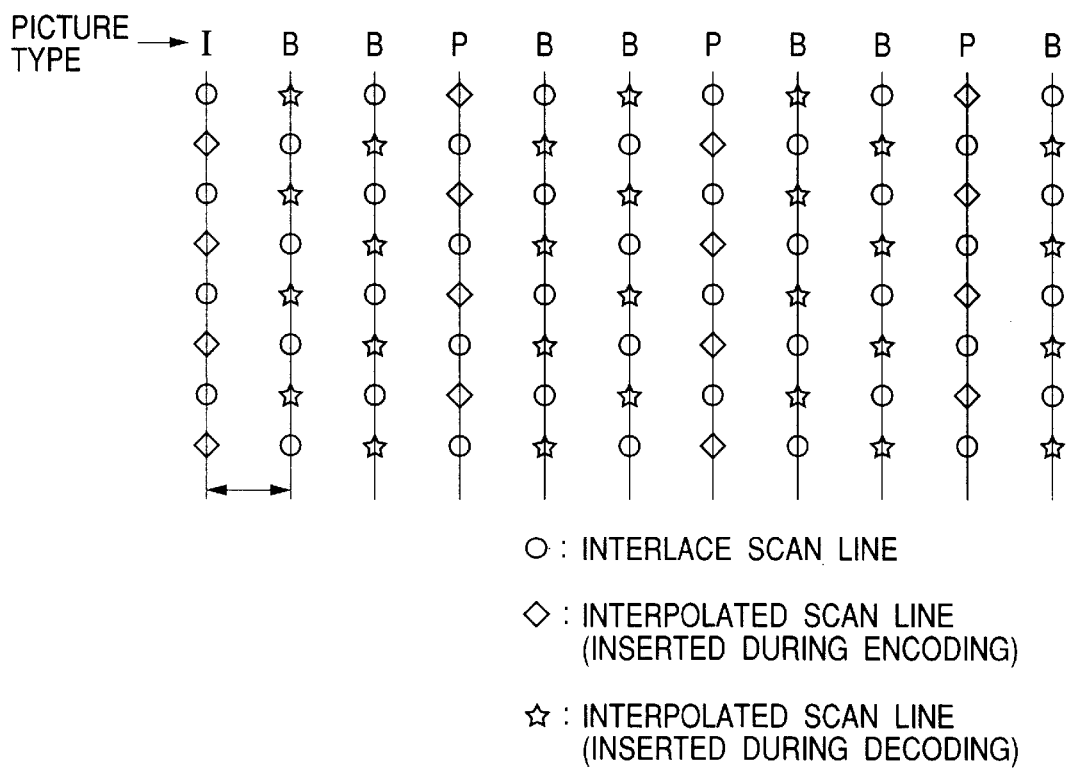
FIG. 8 is a conceptual diagram for illustrating the relationships between the scanning line configurations of successive I, P and B progressive scanning frames which are generated by the video decoding apparatus embodiment of FIG. 7.

FIG. 8 is a diagram for conceptually illustrating the successive progressive scanning frames which are thereby supplied to the video output terminal 43. Respectively different symbols are used in FIG. 8 to indicate scanning lines which are derived in each of three different ways, i.e. scanning lines (indicated by circles) which are reconstructed from original scanning lines of the interlaced fields of the video signal, scanning lines (indicated by diamonds) which are inserted by the operation of the progressive scanning conversion section 1 of the video encoding apparatus of FIG. 1, and scanning lines (indicated by stars) which are inserted as a result of the operation of the scanning line interpolation section 44 in conjunction with the adder 41 in the video decoding apparatus of FIG. 7.

It can be understood from the above description that with the video decoding apparatus embodiment of FIG. 7, by effectively using the inter-picture prediction processing and introducing oversampling processing of the reconstructed prediction error values which are derived for the B fields, it becomes possible to achieve (for the B pictures, of the I, P, B picture types) the same type of progressive scanning conversion processing as that performed on the I and P pictures by the progressive scanning conversion section 1 of the embodiment of FIG. 1. However with the embodiment of FIG. 7 it is made unnecessary to convert each of the B fields to progressive scanning frames prior to encoding and transmission. Thus, the video decoding apparatus embodiment of FIG. 7 in conjunction with the video encoding apparatus of FIG. 1 enables an extremely practical and efficient system to be implemented whereby an interlaced video signal can be subjected to high-efficiency encoding and the resultant code transmitted or recorded, and whereby the resultant received or reconstructed code can be decoded to obtain a progressive scanning video signal.

A further aspect of the present invention is that it enables a digital encoded video recorded medium having a high efficiency of encoding to be realized. Specifically, this can be achieved by multiplexing the picture code sequences which are generated by the video encoding apparatus of FIG. 1 with code sequences for audio and control information using the MPEG system standards, adding error correction codes to the resultant code, modulating a recording signal with the resultant code and then recording the modulated recording signal on a recorded medium.

That is to say, this aspect of the invention can provide an encoded video recorded medium implemented as a recorded medium having recorded thereon interlaced video information which has been subjected to high-efficiency encoding. This is achieved by recording on the recorded medium respective code sequences each of which is derived from a corresponding field of a field interlaced digital video signal, with the code sequences consisting of first and second code sequences, where each of the first code sequences is generated by converting one out of every m fields of the interlaced video signal into a progressive scanning frame having double the number of scanning lines of an interlaced field (where m is an integer of 2 or more), and performing encoding of each such progressive scanning frame either by intra-frame encoding or by unidirectional inter-frame predictive encoding using a progressive scanning frame as a reference frame, and where each of the second code sequences is generated by bidirectional inter-frame predictive encoding of one of the remaining fields of the video signal (i.e., which has been left unchanged as an interlaced scanning field) using preceding and succeeding ones of the progressive scanning frames as reference fields.

The recording can be executed at high speed, in the case of a read-only type of recorded medium, by using a stamper, etc. Reproduced code which is read from such an encoded recorded medium can be decoded to obtain either the original interlaced video signal, by using the first video decoding apparatus embodiment of the invention, or to obtain a progressive scanning video signal, by using the second video decoding apparatus embodiment as described above.

As can be understood from the above description of embodiments, with the present invention, one in m fields of a digital interlaced video signal (where m is an integer of 2 or greater) is converted to a progressive scanning frame and is encoded and decoded either independently within the frame or by unidirectional prediction, while other fields which are left unchanged as interlaced fields are encoded and decoded by bidirectional prediction using preceding and succeeding progressive scanning frames. That is to say, all of the reference pictures which are utilized for inter-picture prediction consist of progressive scanning frames. As a result, the time-axis deviations which occur when interlaced fields (i.e. with each field having a vertical displacement of one scanning line from the preceding field) are used as reference pictures for the purpose of inter-frame predictive encoding can be eliminated, and the criteria for correctly sampling respective scanning lines of a picture can be satisfied, so that no aliasing components are generated in the resultant code. Thus, enhanced code compression can be obtained, since the encoding of aliasing components as a result of inter-picture encoding is eliminated.

Another advantage is as follows. In the prior art, when intra-frame encoding of an I frame is performed, the encoding must utilize two successive fields, which are mutually displaced by one field period along the time axis and also by one scanning line along the vertical picture direction. As a result, aliasing components are generated by such intra-frame encoding. However with the present invention as described hereinabove, each I picture to which intra-frame encoding is applied consists of a single progressive scanning frame. Hence, the problem of generation of aliasing components is again eliminated by the method of the present invention.

Moreover, since the reference pictures for interframe encoding always consist of progressive scanning frames, i.e.,with the scanning line density being twice that of a field, the accuracy of motion estimation in the vertical direction of a picture is accordingly doubled, so that motion compensation is accordingly more accurate than is possible with the prior art method.

For example, if the value of m (i.e., for selecting one in every m successive fields or frames as described hereinabove) were to be made the same as that used with the prior art example of video encoding apparatus, then since with the present invention the picture types (i.e., I, P, B) are established in units of fields, the inter-picture prediction distance would be halved, in the case of a video encoding apparatus according to the present invention. Hence, the prediction error values would be accordingly made smaller. If on the other hand the inter-picture prediction distance were to be made the same as that of the prior art video encoding apparatus example, then by comparison with the prior art video encoding apparatus example, the value of m could be doubled and hence the proportion of B frames could be made accordingly greater, with the apparatus of the present invention. Since the B frames are encoded by bidirectional prediction, and so require a smaller amount of code than the P and I frames, a correspondingly greater degree of code compression can be achieved.

Moreover according to another aspect of the invention, in spite of the fact the conversion processing for converting interlaced scanning fields to progressive scanning frames is performed on only one in m of the total number of fields, it is possible with the present invention (as described hereinabove referring to the video decoding apparatus embodiment of FIG. 7) to configure the decoding system such that although a field-interlaced video signal is encoded, the finally decoded video signal is a progressive scanning video signal in which each frame corresponds to a field of the original interlaced video signal, so that the frame frequency is twice that of the original video signal. In that way, the decoded video signal can be in a form which can be directly supplied to various types of display apparatus such as computer monitors, liquid crystal displays, PDP displays, etc., i.e., to those types of apparatus which can display only progressive scanning pictures, and high display quality can be achieved.

What is claimed is:

1. A video encoding apparatus for encoding an interlaced video signal, comprising:

progressive scanning conversion means for converting one field of every m fields (where m is an integer of value 2 or greater) of said interlaced video signal to a single progressive scanning frame which has twice the scanning line density of an interlaced field, while leaving the remaining fields unchanged as interlaced scanning fields, first encoding means for encoding each said progressive scanning frame either by independent internal encoding of the frame or by unidirectional predictive encoding based on progressive scanning frames which have been encoded, and second encoding means for performing predictive encoding of each remaining field of said video signal other than said fields which are converted to progressive scanning frames, using, as reference frames for said predictive encoding, selected ones of said progressive scanning frames which precede and succeed said each remaining field along the time axis.

2. The video encoding apparatus according to claim 1, wherein said second encoding means performs scanning line decimation processing of each said progressive scanning frame which is selected as a reference frame, to convert said progressive scanning frame to have the same number of scanning lines as an interlaced scanning field, and performs predictive encoding of said each remaining field with said field left unchanged in interlaced scanning form.

3. The video encoding apparatus according to claim 1, comprising inter-picture prediction means for deriving prediction signal values based on said progressive scanning frames which have been encoded, and wherein said second encoding means comprises decimation means for:

receiving from said inter-picture prediction section, in synchronism with execution of encoding processing for said each remaining field, a set of prediction signal values derived based on said preceding and succeeding progressive scanning frames, executing decimation processing of said set to remove all prediction signal values other than sub-sets of prediction signal values which respectively correspond to scanning lines of said each remaining field, and applying remaining ones of said prediction signal values of the set in said predictive encoding of said each remaining field.

4. A video decoding apparatus for executing decoding of successive code sequences which have been generated by encoding respective progressive scanning frames derived by doubling the scanning line density of one in every m fields of an original interlaced video signal (where m is an integer of 2 or greater), with the encoding process using intra-frame predictive encoding or unidirectional predictive encoding, and by encoding remaining fields of said video signal directly as interlaced scanning fields, with the encoding process using bidirectional predictive encoding based on preceding and succeeding ones of said progressive scanning frames, the video decoding apparatus comprising:

first decoding means for decoding each of said code sequences corresponding to said progressive scanning frames by intra-frame decoding of said code sequence or by unidirectional predictive decoding of said code sequence using decoded ones of said progressive scanning frames, second decoding means for performing bidirectional predictive decoding of respective code sequences corresponding to each of said fields which have been encoded as interlaced scanning fields, using as reference frames decoded ones of said progressive scanning frames which precede and succeed the field corresponding to said code sequence along the time axis, and picture reconfiguration means for performing decimation of scanning lines of each of the progressive scanning frames which have been decoded by the first decoding means, to obtain a converted field having the same number of scanning lines as an interlaced scanning field, and for executing time-axis combination of respective ones of said converted fields with said fields which are derived by said second decoding means, in an appropriate sequence for reproducing said original interlaced video signal.

5. The video decoding apparatus according to claim 4, wherein said second decoding means performs scanning line decimation processing of each said progressive scanning frame which is used as a reference frame, to convert said progressive scanning frame to have the same number of scanning lines as an interlaced scanning field, and performs predictive encoding of said each field which has been encoded as an interlaced scanning field, with said field left unchanged in interlaced scanning form.

6. The video decoding apparatus according to claim 4, comprising inter-picture prediction means for deriving prediction signal values based on decoded ones of said progressive scanning frames, and wherein said second encoding means comprises decimation means for:

receiving from said inter-picture prediction means, in synchronism with execution of said decoding processing for a field which was encoded as an interlaced scanning field, a set of prediction signal values derived based on said decoded preceding and succeeding progressive scanning frames, executing decimation processing of said set to remove all prediction signal values other than sub-sets of prediction signal values which respectively correspond to scanning lines of said field, and applying remaining ones of said prediction signal values of the set in said predictive decoding of the code sequence corresponding to said field.

7. A video decoding apparatus for executing decoding of encoded progressive scanning frames derived by doubling the scanning line density of one in every m fields of an interlaced video signal (where m is an integer of 2 or greater), with the encoding process using intra-frame encoding or unidirectional predictive encoding, and by encoding remaining fields of said video signal directly as interlaced scanning fields, the video decoding apparatus comprising:

decoding means for decoding each of said encoded progressive scanning frames by intra-frame decoding or by unidirectional predictive decoding using decoded ones of said progressive scanning frames, to thereby obtain a first series of reconstructed pictures, prediction error decoding means for decoding of prediction error values for each of said remaining fields which are encoded as interlaced scanning fields, interpolation means for performing over-sampling of said prediction error values in a vertical scanning direction of a field, to derive reconstructed prediction error values corresponding to ones of said progressive scanning frames, inter-picture prediction means for deriving prediction signal values for each of said fields which were encoded unchanged as interlaced scanning fields, using a preceding one and a succeeding one of said first series of reconstructed pictures as reference frames, adder means for adding to said prediction signal values said reconstructed prediction error values corresponding to progressive scanning lines, to thereby obtain a second series of reconstructed pictures, and picture reconfiguration means for inserting said second series of reconstructed pictures into said first series of reconstructed pictures to obtain a reconstructed video signal in which all pictures are expressed as progressive scanning frames.

8. An encoded video recording medium having recorded thereon code expressing interlaced video information which has been encoded by high-efficiency encoding of an interlaced video signal, said encoding being characterized in that, one in every m fields of said interlaced video signal (where m is an integer of 2 or greater) is converted to a progressive scanning frame having double the number of scanning lines while remaining fields are left unchanged as interlaced scanning fields, each of the progressive scanning frames is either independently internally encoded or is encoded by unidirectional prediction encoding using as reference frames progressive scanning frames which have already been encoded, to thereby obtain respective first code sequences corresponding to said progressive scanning frames, each of the remaining fields which are left unchanged as interlaced scanning fields is encoded by bidirectional prediction using preceding and succeeding ones of the encoded progressive scanning frames as reference frames, to thereby obtain respective second code sequences corresponding to said remaining fields, and said first and second code sequences are recorded to constitute said encoded video recorded medium.

9. A method of encoding an interlaced video signal, comprising;

converting one field of every m fields (where m is an integer of value 2 or greater) of said interlaced video signal to a single progressive scanning frame which has twice the scanning line density of an interlaced field, while leaving remaining fields of said video signal unchanged as interlaced scanning fields, encoding each said progressive scanning frame either by independent internal encoding of the frame or by unidirectional predictive encoding based on progressive scanning frames which have been encoded, and performing predictive encoding of the remaining fields of said video signal other than said fields which are converted to progressive scanning frames, using, as reference frames for deriving respective sets of prediction signal values corresponding to each of said remaining fields, selected ones of said progressive scanning frames which precede and succeed said each remaining field along the time axis.

10. The method according to claim 9, further comprising:

performing decimation processing of each of said sets of prediction signal values to remove respective sub-sets of prediction signal values which do not correspond to scanning lines of said each remaining field, to thereby obtain a set of prediction signal values for use in predictive encoding of said each remaining field.

11. A method of decoding successive code sequences which have been generated by a first encoding process applied to respective progressive scanning frames which have been derived by doubling the scanning line density of one in every m fields of an original interlaced video signal (where m is an integer of 2 or greater), with the first encoding process using intra-frame predictive encoding or unidirectional predictive encoding, and by encoding remaining fields of said video signal directly as interlaced scanning fields in a second encoding process, with the second encoding process using bidirectional predictive encoding based on preceding and succeeding ones of said progressive scanning frames, the method comprising:

executing decoding each of respective code sequences corresponding to each of said progressive scanning frames by intra-frame decoding of said code sequence or by unidirectional predictive decoding of said code sequence using decoded ones of said progressive scanning frames, and executing predictive decoding of respective code sequences corresponding to each of said fields which have been encoded as interlaced scanning fields, using as reference frames decoded ones of said progressive scanning frames which precede and succeed the field corresponding to said code sequence along the time axis, performing decimation of scanning lines of each of the progressive scanning frames which have been decoded by the first decoding means, to obtain a converted field having the same number of scanning lines as an interlaced scanning field, and combining respective ones of said converted fields and said fields which are derived by said second decoding means, along the time axis, in an appropriate sequence for reproducing said original interlaced video signal.

12. The decoding method of claim 11, wherein said predictive decoding of a code sequence corresponding to a field which has been encoded as interlaced scanning fields is performed by;

deriving a set of prediction signal values based on decoded progressive scanning frames which precede and succeed said field along the time axis, executing decimation processing of said set to remove all prediction signal values other than sub-sets of prediction signal values which respectively correspond to scanning lines of said field, and applying remaining ones of said set of prediction signal values in said predictive decoding of the code sequence corresponding to said field.

13. A method of decoding successive code sequences which have been generated by encoding respective progressive scanning frames derived by doubling the scanning line density of one in every m fields of an original interlaced video signal (where m is an integer of 2 or greater), with the encoding process using intra-frame encoding or unidirectional predictive encoding, and by encoding remaining fields of said video signal directly as interlaced scanning fields, the decoding method comprising:

decoding each of said progressive scanning frames by intra-frame decoding or by unidirectional predictive decoding using decoded ones of said progressive scanning frames, to thereby obtain a first series of reconstructed pictures, respective sets of prediction error values for each of said remaining fields which are encoded as interlaced scanning fields, performing over-sampling of said prediction error values in a vertical scanning direction of a field, to generate reconstructed prediction error values corresponding to scanning lines of a progressive scanning frame, deriving, for said each field which was encoded as an interlaced scanning field, prediction signal values based on selected ones of said first series of progressive scanning frames which precede and succeed said each field along the time axis, as reference frames, adding said prediction signal values to said reconstructed prediction error values, to thereby obtain a second series of reconstructed pictures, and inserting said second series of reconstructed pictures into said first series of reconstructed pictures to obtain a reconstructed video signal in which all pictures are expressed as progressive scanning frames.

* * * * *

UNITED STATES PATENT AND TRADEMARK OFFICE
CERTIFICATE OF CORRECTION

PATENT NO. : 6,188,725 B1
DATED : February 13, 2001
INVENTOR(S) : Kenji Sugiyama It is certified that error appears in the above-identified patent and that said Letters Patent is hereby corrected as shown below:

<u>Title page, item [54], column 1,</u>
Lines 1-6, should read: -- INTERPLACED VIDEO SIGNAL ENCODING AND DECODING METHOD, AND ENCODING APPARATUS AND DECODING APPARATUS UTILIZING THE METHOD, PROVIDING HIGH EFFICIENCY OF ENCODING BY CONVERSION OF PERIODICALLY SELECTED FIELDS TO PROGRESSIVE SCAN FRAMES WHICH FUNCTION AS REFERENCE FRAMES FOR PREDICTIVE ENCODING --.

Signed and Sealed this

Eighteenth Day of September, 2001

*Attest:*

NICHOLAS P. GODICI
*Attesting Officer*     *Acting Director of the United States Patent and Trademark Office*

UNITED STATES PATENT AND TRADEMARK OFFICE
CERTIFICATE OF CORRECTION

PATENT NO.    : 6,188,725 B1                                             Page 1 of 1
DATED         : February 13, 2001
INVENTOR(S)   : Kenji Sugiyama It is certified that error appears in the above-identified patent and that said Letters Patent is hereby corrected as shown below:

<u>Title page, item [54], column 1,</u>
Lines 1-6, should read -- INTERLACED VIDEO SIGNAL ENCODING AND DECODING METHOD, AND ENCODING APPARATUS AND DECODING APPARATUS UTILIZING THE METHOD, PROVIDING HIGH EFFICIENCY OF ENCODING BY CONVERSION OF PERIODICALLY SELECTED FIELDS TO PROGRESSIVE SCAN FRAMES WHICH FUNCTION AS REFERENCE FRAMES FOR PREDICTIVE ENCODING --.

This certificate supersedes Certificate of Correction issued September 18, 2001.

Signed and Sealed this

Third Day of June, 2003

JAMES E. ROGAN
*Director of the United States Patent and Trademark Office*